United States Patent Office 3,100,779
Patented Aug. 13, 1963

3,100,779
NOVEL PRODUCTS AND METHODS FOR
PREPARING THEM
Hans S. Mannheimer, 23 Haines Cove Drive,
Toms River, N.J.
No Drawing. Filed June 30, 1961, Ser. No. 120,921
3 Claims. (Cl. 260—327)

This invention relates to novel compounds and also to methods for producing them. In one of its more specific aspects the invention is directed to novel sultone and to methods for producing it in high yields.

Prior to this invention it has ben proposed to make propane sultone which is a compound of the following formula:

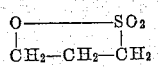
$$\underset{CH_2-CH_2-CH_2}{O\underline{\qquad\qquad}SO_2}$$

That compound is solid at 20° C. but has a low melting point of 31° C. so that in storage and transportation due to seasonal temperature variations, the state thereof changes. That compound is very expensive. More significantly that compound is only partially miscible with water at 20° C. A further and even more significant disadvantage inherent in said compound is that upon heating a mixture of the same in water, it hydrolyzes very rapidly.

In the course of my experimentations, I have discovered that it is possible to prepare a novel sultone at a price which is very steap when compared with that of propane sultone. The novel sultone of the present invention differs materially and significantly from propane sultone. My novel sultone is a white crystalline solid having a melting point in excess of 100° C. so that it will be substantially unaffected physically by the seasonal temperature variations encountered in storage and transportation. Even more significantly I discovered that my novel sultone is water-soluble at 20° C.; and I was further surprised to discover that my novel sultone has greater resistance to hydrolysis at elevated temperatures. In fact, because of such unexpected characteristic of resistance to hydrolysis, I have found it commercially feasible and inexpensive to produce my novel sultone in an aqueous medium and because of its excellent water-solubility characteristic at room and elevated temperatures coupled with its resistance to hydrolysis at such temperatures, my novel sultone while in an aqueous medium may be employed as a reactant in the production therefrom of various compounds, such as sulfonates of improved properties.

The novel sultone of the present invention may be prepared by the employment of readily available and inexpensive reactants and the methods for preparing it are relatively simple and inexpensive. First, sodium meta bisulfite ($Na_2S_2O_5$) in aqueous solution and in the presence of a small amount of caustic soda is heated thereby to convert it to well known sodium acid sulfite ($NaHSo_3$). Then the sodium acid sulfite in aqueous solution is reacted with epichlorhydrin.

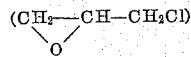
$$(CH_2\underline{\quad}CH-CH_2Cl)$$
$$\diagdown O \diagup$$

to provide an intermediate of the formula

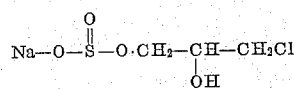
$$Na-O-\overset{O}{\underset{\|}{S}}-O\cdot CH_2-\underset{OH}{CH}-CH_2Cl$$

According to this invention said intermediate while in aqueous solution is heat converted to the novel sultone of the present invention. Said novel sultone is a crystalline solid of high resistance to hydrolysis characteristics, has high water-solubility and is of the following structural formula:

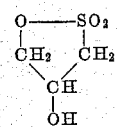
$$\begin{array}{c}O\underline{\qquad}SO_2\\ |\qquad\quad|\\ CH_2\quad CH_2\\ \diagdown\diagup\\ CH\\ |\\ OH\end{array}$$

High yields of said novel sultone measuring by weight at least 50% of theoretical may be obtained by boiling an aqueous solution of said intermediate for a period of one-half to 3 hours.

Said novel sultone, I have discovered, finds application in a number of different fields. It may be used as an acidic catalyst or hardening agent for various intermediate resins which are capable of being thermoset at pH conditions of approximately 4 and in addition, it finds application as a reactant while in aqueous solutions with various compounds to produce sulfonates.

The following Example 1 is an illustrative embodiment of a novel method which may be employed for the production of the novel sultone of this invention, all parts being given by weight, unless otherwise specified.

Example 1

About 104 parts of sodium meta bisulfite were charged into a glass flask and then there was also charged into said flask 600 parts of water into which was dissolved 1 cc. of a 50% aqueous solution of NaOH thereby to dissolve said sodium meta bisulfite therein. The solution was then heated to about 90° C. and maintained at that temperature for a period of about 15 minutes thereby to convert substantially all of the sodium meta bisulfite to sodium acid sulfite. The resultant solution of sodium acid sulfite is cooled to about 28° C. and by slow additions 101 parts of a reactant, epichlorhydrin, is added thereto with constant stirring over a 45 minute period, and the temperature of the mass throughout said period is controlled by external cooling thereby to maintain the temperature thereof at about 47°–50° C. throughout said period during which the mass is constantly stirred. Thereafter and for the next 2½ hours, stirring of the mass is continued and its temperature maintained at 47°–50° C. thereby to produce an aqueous solution of the intermediate,

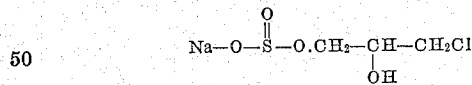
$$Na-O-\overset{O}{\underset{\|}{S}}-O\cdot CH_2-\underset{OH}{CH}-CH_2Cl$$

Then a reflux condenser is coupled with said flask and said aqueous solution therein while under said condenser is heated to boiling and is maintained, in that condition, under said condenser for a period of about 1 hour. Then the mass in said flask is cooled to room temperature and consists essentially of an aqueous solution of sodium chloride and the novel sultone, whose structural formula is hereinbefore set forth. The quantity of said sultone in solution measures more than 90% of theoretical yield. If desired the novel sultone may be separated from said sodium chloride and water of said aqueous solution, by evaporating off the water under very low pressure and low temperature conditions leaving a solid mass and the sultone may be separated from the NaCl in said mass by the use of a selective solvent, such as ethyl alcohol which is later stripped off leaving behind said novel sultone in the substantially pure condition and being a crystalline solid of high water-solubility at temperatures of 20°–100° C. and having great resistance to hydrolysis in that temperature range.

I claim:
1. A compound of the following formula:

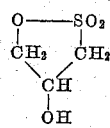

2. The method for producing a compound of the formula set forth in claim 1, comprising boiling an aqueous solution of

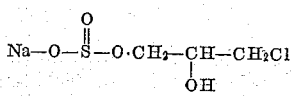

3. The method comprising maintaining in the state of boiling an aqueous solution of

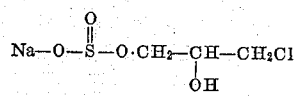

for a period in the range of about ½ to 3 hours thereby to produce a yield at least 50% of theoretical of a compound of the formula set forth in claim 1.

References Cited in the file of this patent
UNITED STATES PATENTS
2,799,702    Gaertner _____ July 16, 1957

FOREIGN PATENTS
1,107,220    Germany _____ May 25, 1961

OTHER REFERENCES

Chem. Abstracts, volume 53, page 2085 (1959), Abstracting Manecke et al., Agnew. Chem. 70:503 (1958).

Chem. Abstracts, volume 58, page 12759 (1958)), Abstracting Matusi et al., Nippon Nagei-Kagaku Kaishi 31:233–5 (1957).

Mustafa: Chemical Reviews, volume 54, pages 197–206 (1954).